US012684413B2

(12) United States Patent
Kanamarlapudi et al.

(10) Patent No.: US 12,684,413 B2
(45) Date of Patent: Jul. 14, 2026

(54) PRECLUSIVE DATA DECOMPRESSION FAILURE TECHNIQUES

(71) Applicant: QUALCOMM Incorporated, San Diego, CA (US)

(72) Inventors: Sitaramanjaneyulu Kanamarlapudi, San Diego, CA (US); Leena Zacharias, San Jose, CA (US); Prasad Reddy Kadiri, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 103 days.

(21) Appl. No.: 17/332,981

(22) Filed: May 27, 2021

(65) Prior Publication Data

US 2021/0377794 A1     Dec. 2, 2021

Related U.S. Application Data

(60) Provisional application No. 63/032,802, filed on Jun. 1, 2020.

(51) Int. Cl.
| | |
|---|---|
| *H04W 28/04* | (2009.01) |
| *H04L 1/16* | (2023.01) |
| *H04W 72/23* | (2023.01) |

(52) U.S. Cl.
CPC ............... *H04W 28/04* (2013.01); *H04L 1/16* (2013.01); *H04W 72/23* (2023.01)

(58) Field of Classification Search
CPC .... H04W 28/04; H04W 72/1289; H04L 1/16; H04L 1/1832; H04L 1/1887;

(Continued)

(56) References Cited

U.S. PATENT DOCUMENTS

| | | | |
|---|---|---|---|
| 2006/0187846 A1 | 8/2006 | Pelletier et al. | |
| 2008/0151861 A1* | 6/2008 | Zhang ............... | H04W 28/0205 370/349 |

(Continued)

OTHER PUBLICATIONS

"3rd Generation Partnership Project Technical Specification Group Radio Access Network Evolved Universal Terrestrial Radio Access (E-UTRA) Packet Data Convergence Protocol (PDCP) Specification (Release 16)", 3GPP TS 36.323 V16.0.0 (Mar. 2020), 3GPP Draft, Draft, 36323-G00 V2, 3rd Generation Partnership Project (3GPP), Mobile Competence Centre, 650, Route Des Lucioles, F-06921 Sophia-Antipolis Cedex, France, [Online] Apr. 8, 2020 (Apr. 8, 2020), XP051869436, 56 Pages, Retrieved from the Internet: URL: https://ftp.3gpp.org/tsg_ran/WG2_RL2/Specifications/202003_draft_specs_after_RAN_87/Draft_36323-g00_v2.docx. [Retrieved on Apr. 8, 2020] Sections 5.2, 5.5, 5.11.

(Continued)

*Primary Examiner* — Derrick W Ferris
*Assistant Examiner* — M Mostazir Rahman
(74) *Attorney, Agent, or Firm* — Norton Rose Fulbright US LLP

(57) ABSTRACT

Preclusive data decompression failure techniques, such as may avoid data decompression failures using predictive decompression failure indications and/or configure communication devices for data transmission recovery before reordering window timer expiration, are described. Preclusive data compression failure operation may, for example, initiate compressor memory resets conditionally according to some aspects of the present disclosure, such as using one or more trigger events to predictively indicate decompression failure. Additionally or alternatively, preclusive data compression failure operation may provide for configuring communication devices for data transmission recovery before reordering window timer expiration, such as configuration for prioritization to provide data transmission recovery before (Continued)

reordering window timer expiration. Other aspects and features are also claimed and described.

27 Claims, 8 Drawing Sheets

(58) Field of Classification Search
CPC ..... H04L 1/1896; H04L 69/28; H04L 1/1848; H04L 1/1812; H04L 67/61; H04L 69/04; H04L 69/40
See application file for complete search history.

(56) References Cited

U.S. PATENT DOCUMENTS

| 2015/0085835 | A1* | 3/2015 | Eravelli | H04L 69/04 |
| | | | | 370/336 |
| 2016/0142518 | A1* | 5/2016 | Raina | H04L 69/04 |
| | | | | 370/230 |
| 2016/0241685 | A1* | 8/2016 | Shah | H04W 28/06 |
| 2017/0075778 | A1* | 3/2017 | Heliker | G06F 11/0721 |
| 2017/0091014 | A1* | 3/2017 | Bressanelli | H04L 69/04 |
| 2018/0077068 | A1* | 3/2018 | Dhanabalan | H04L 69/04 |
| 2019/0141567 | A1* | 5/2019 | Liu | H04L 69/04 |
| 2021/0334668 | A1* | 10/2021 | Abelha Ferreira | G06N 20/00 |
| 2022/0264387 | A1* | 8/2022 | Kim | H04W 36/18 |

OTHER PUBLICATIONS

Loughney, J et al., "Context Transfer Protocol (CXTP)" IETF Standard, Request for Comments: RFC4067, Internet Engineering Task Force, IETF, CH, Internet Society (ISOC) 4, Rue Des Falaises CH-1205 Geneva, Switzerland, Jul. 2005 (Jul. 2005), XP015041932, pp. 1-33, ISSN: 0000-0003, p. 2-p. 16.
Partial International Search Report—PCT/US2021/034813—ISA/EPO—Sep. 8, 2021 (203915WO).
Price R., et al., "Universal Decompression Algorithm, Draft-ietf-Rohc-Sigcomp-Algorithm-00.txt", Universal Decompression Algorithm Draft-IETF-Rohc-Sigcomp-Algorithm-00.TXT, Internet Engineering Task Force, IETF Standard Working Draft, Internet Society (ISOC) 4, Rue Des Falaises, CH-1205, Geneva, Switzerland, vol. rohc, Nov. 14, 2001 (Nov. 14, 2001), XP015026756, 21 Pages, Sections 3 and 4.
International Search Report and Written Opinion—PCT/US2021/034813—ISA/EPO—Oct. 29, 2021 (203915WO).

* cited by examiner

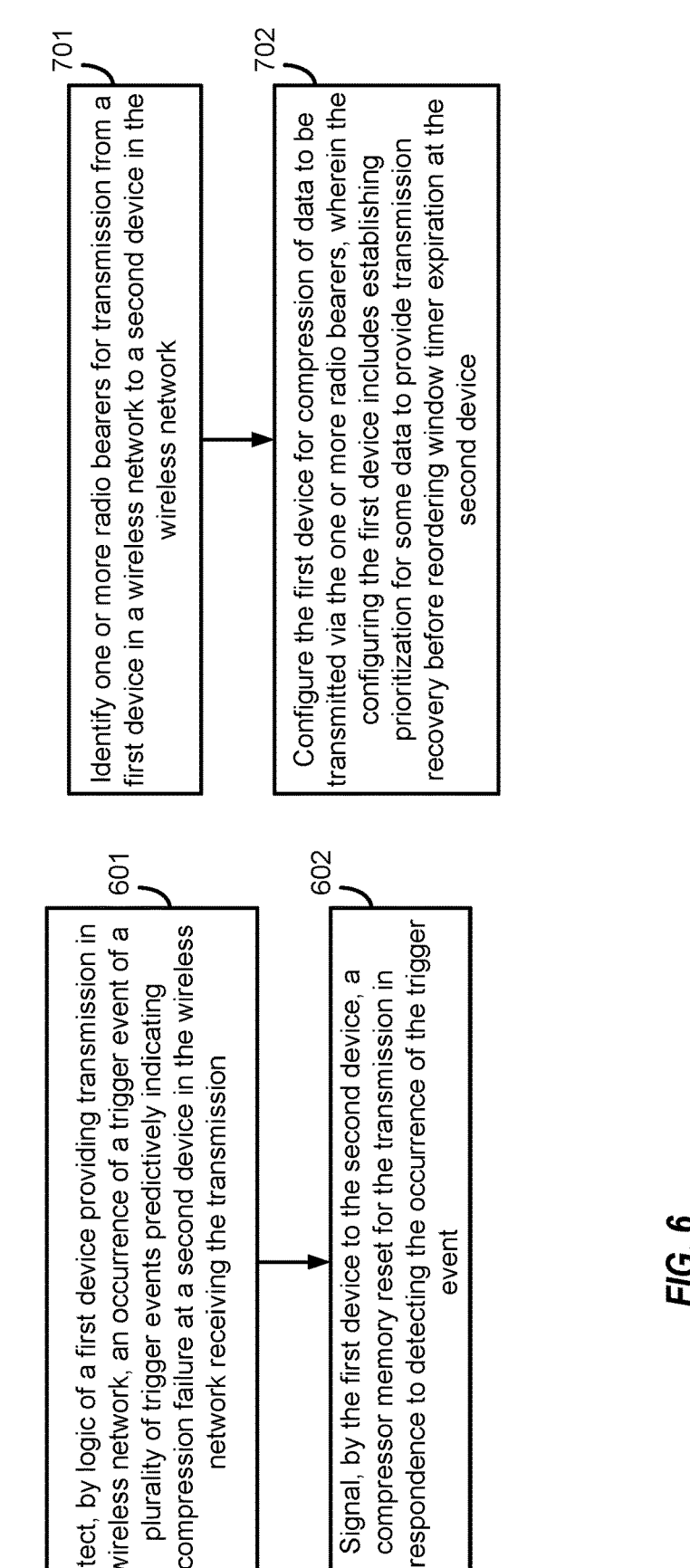

700

701 Identify one or more radio bearers for transmission from a first device in a wireless network to a second device in the wireless network 702 Configure the first device for compression of data to be transmitted via the one or more radio bearers, wherein the configuring the first device includes establishing prioritization for some data to provide transmission recovery before reordering window timer expiration at the second device

601 Detect, by logic of a first device providing transmission in a wireless network, an occurrence of a trigger event of a plurality of trigger events predictively indicating decompression failure at a second device in the wireless network receiving the transmission 602 Signal, by the first device to the second device, a compressor memory reset for the transmission in correspondence to detecting the occurrence of the trigger event

*FIG. 6*

PRECLUSIVE DATA DECOMPRESSION FAILURE TECHNIQUES

CROSS-REFERENCE TO RELATED APPLICATIONS

This application claims the benefit of U.S. Provisional Patent Application No. 63/032,802, entitled, "PRECLUSIVE DATA DECOMPRESSION FAILURE TECHNIQUES," filed on Jun. 1, 2020, the disclosure of which is expressly incorporated by reference herein in its entirety.

TECHNICAL FIELD

Aspects of the present disclosure relate generally to wireless communication systems, and more particularly, to wireless communications implementing data compression. Certain embodiments of the technology discussed below can enable and provide preclusive data decompression failure techniques, such as may avoid data decompression failures using predictive decompression failure indications and/or configuring communication devices for data transmission recovery before reordering window timer expiration.

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

For example, efficient spectrum usage and utilization for different types of user applications is becoming more and more important in order to accommodate increased data rate and capacity demands. Accordingly, various compression techniques have been proposed for facilitating increased efficiency with respect to spectrum usage. There have, for example, been several compression methods introduced for providing packet header compression, such as Internet protocol (IP) header compression (IPHC) and robust header compression (RoHC). Additionally, there have been several compression methods introduced for providing uplink data compression (UDC), such as adaptive packet data compression (APDC) and Deflate.

BRIEF SUMMARY OF SOME EMBODIMENTS

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method of wireless communication is provided. The method may include detecting, by logic of a first device providing transmission in a wireless network, an occurrence of a trigger event of a plurality of trigger events predictively indicating decompression failure at a second device in the wireless network receiving the transmission. The method may further include signaling, by the first device to the second device, a compressor memory reset for the transmission in correspondence to detecting the occurrence of the trigger event.

In an additional aspect of the disclosure, an apparatus configured for wireless communication is provided. The apparatus may include means for detecting, by a first device providing transmission in a wireless network, an occurrence of a trigger event of a plurality of trigger events predictively indicating decompression failure at a second device in the wireless network receiving the transmission. The apparatus may further include means for signaling, by the first device to the second device, a compressor memory reset for the transmission in correspondence to detecting the occurrence of the trigger event.

In an additional aspect of the disclosure, a non-transitory computer-readable medium having program code recorded thereon for wireless communication is provided. The program code may include code to detect, by a first device providing transmission in a wireless network, an occurrence of a trigger event of a plurality of trigger events predictively indicating decompression failure at a second device in the wireless network receiving the transmission. The program code may further include code to signal, by the first device to the second device, a compressor memory reset for the transmission in correspondence to detecting the occurrence of the trigger event.

In an additional aspect of the disclosure, an apparatus configured for wireless communication is provided. The apparatus includes at least one processor, and a memory coupled to the processor. The processor may be configured to detect, by a first device providing transmission in a wireless network, an occurrence of a trigger event of a plurality of trigger events predictively indicating decompression failure at a second device in the wireless network receiving the transmission. The processor may further be configured to signal, by the first device to the second device, a compressor memory reset for the transmission in correspondence to detecting the occurrence of the trigger event.

In accordance with aspects of the disclosure, the foregoing systems, methods, and apparatuses may be implemented in combination with one or more additional features, such as the following features whether alone or in combination. For example, the above systems, methods, and apparatuses may include the trigger event predictively indicating decompression failure due to reordering window timer expiration at the second device. The above systems, methods, and apparatuses may include the trigger event corresponding to a reconfiguration between use of split radio bearers and use of non-split radio bearers. The above systems, methods, and apparatuses may include the trigger event corresponding to a secondary cell group (SCG) radio link failure (RLF). The above systems, methods, and apparatuses may include the trigger event corresponding to one or more radio link control (RLC) layer automatic repeat request (ARQ) metrics measured by the first device. The above systems, methods, and apparatuses may include the one or more RLC layer ARQ metrics comprising a round trip time versus reordering window timer duration metric. The above systems, methods, and apparatuses may include the trigger event corresponding to at least one of a media access control (MAC) metric measured by the first device or a hybrid automated repeat request (HARQ) metric measured by the first device. The above systems, methods, and apparatuses may include the at least one of the MAC metric or the HARQ metric comprising a block error rate (BLER). The above systems, methods, and apparatuses may include the trigger event corresponding to at least one of a scheduling delay during an outstanding retransmission or a RLC layer status not being received by the first device. The above systems, methods, and apparatuses may include providing dynamic compressor memory reset upon occurrence of any trigger event of the plurality of trigger events being met, wherein the determining the occurrence of the trigger event and the signaling the compressor memory reset provide the dynamic compressor memory reset upon the occurrence of the trigger event. The above systems, methods, and apparatuses may include providing static compressor memory reset configured for periodic compressor memory reset for the transmission. The above systems, methods, and apparatuses may include the periodic compressor memory reset being based at least in part on a number of packets of the transmission. The above systems, methods, and apparatuses may include establishing prioritization for some data of the transmission to provide transmission recovery before reordering window timer expiration at the second device. The above systems, methods, and apparatuses may include the establishing prioritization for some data of the transmission including prioritizing RLC layer level retransmissions of a bearer carrying compressed data of the transmission over transmissions of one or more other bearers. The above systems, methods, and apparatuses may include the establishing prioritization for some data including prioritizing a MAC level grant associated with the data. The above systems, methods, and apparatuses may include increasing a duration of the reordering window timer. The above systems, methods, and apparatuses may include the duration of the reordering window timer being dynamically increased based on block error rate (BLER) conditions.

In one aspect of the disclosure, a method of wireless communication is provided. The method may include identifying one or more radio bearers for transmission from a first device in a wireless network to a second device in the wireless network. The method may further include configuring the first device for compression of data to be transmitted via the one or more radio bearers. Configuring the first device may include establishing prioritization for some data to provide transmission recovery before reordering window timer expiration at the second device.

In an additional aspect of the disclosure, an apparatus configured for wireless communication is provided. The apparatus may include means for identifying one or more radio bearers for transmission from a first device in a wireless network to a second device in the wireless network. The apparatus may further include means for configuring the first device for compression of data to be transmitted via the one or more radio bearers. Configuring the first device may include establishing prioritization for some data to provide transmission recovery before reordering window timer expiration at the second device.

In an additional aspect of the disclosure, a non-transitory computer-readable medium having program code recorded thereon for wireless communication is provided. The program code may include code to identify one or more radio bearers for transmission from a first device in a wireless network to a second device in the wireless network. The program code may further include code to configure the first device for compression of data to be transmitted via the one or more radio bearers. Configuring the first device may include establishing prioritization for some data to provide transmission recovery before reordering window timer expiration at the second device.

In an additional aspect of the disclosure, an apparatus configured for wireless communication is provided. The apparatus includes at least one processor, and a memory coupled to the processor. The processor may be configured to identify one or more radio bearers for transmission from a first device in a wireless network to a second device in the wireless network. The processor may further be configured to configure the first device for compression of data to be transmitted via the one or more radio bearers. Configuring the first device may include establishing prioritization for some data to provide transmission recovery before reordering window timer expiration at the second device.

In accordance with aspects of the disclosure, the foregoing systems, methods, and apparatuses may be implemented in combination with one or more additional features, such as the following features whether alone or in combination. For example, the above systems, methods, and apparatuses may include the establishing prioritization for some data providing compression gain configured for a particular application associated with the data. The above systems, methods, and apparatuses may include the establishing prioritization for some data being configured in accordance with tolerance to latency by a particular application associated with the data. The above systems, methods, and apparatuses may include the establishing prioritization for some data including prioritizing RLC layer level retransmissions of a bearer carrying compressed data of the transmission over transmissions of one or more other bearers. The above systems, methods, and apparatuses may include the establishing prioritization for some data including prioritizing a MAC level grant associated with the data. The above systems, methods, and apparatuses may include increasing a duration of the reordering window timer. The above systems, methods, and apparatuses may include the duration of the reordering window timer is dynamically increased based on BLER conditions. The above systems, methods, and apparatuses may include determining, by the first device, an occurrence of a trigger event of a plurality of trigger events selected to predictively indicate decompression failure at the second device, and signaling, by the first device to the second device, a compressor memory reset for the transmission based at least in part on determining the occurrence of the trigger event. The above systems, methods, and apparatuses may include the trigger event predictively indicating decompression failure due to reordering window timer expiration at the second device. The above systems, methods, and apparatuses may include the trigger event corresponding to a reconfiguration between use of split radio bearers and use of non-split radio bearers. The above systems, methods, and apparatuses may include the trigger event corresponding to a SCG RLF. The above systems, methods, and apparatuses may include the trigger event corresponding to one or more RLC layer ARQ metrics measured by the first device. The above systems, methods, and apparatuses may include the trigger event corresponding to at least one of a MAC metric measured by the first device or a HARQ metric measured by the first device. The above systems, methods, and apparatuses may include the trigger event corresponding to at least one of a scheduling delay during an outstanding retransmission or a RLC layer status not being received by the first device. The above systems, methods, and apparatuses may include providing dynamic compressor memory reset upon occurrence of any trigger event of the plurality of trigger events being met, wherein the determining the occurrence of the trigger event and the signaling the compressor memory reset provide the dynamic compressor memory reset upon the occurrence of the trigger event. The above systems, methods, and apparatuses may include providing static compressor memory reset configured for periodic compressor memory reset for the transmission.

Other aspects, features, and embodiments will become apparent to those of ordinary skill in the art, upon reviewing the following description of specific, exemplary embodiments in conjunction with the accompanying figures. While features may be discussed relative to certain embodiments and figures below, all embodiments can include one or more of the advantageous features discussed herein. In other words, while one or more embodiments may be discussed as having certain advantageous features, one or more of such features may also be used in accordance with the various embodiments. In similar fashion, while exemplary embodiments may be discussed below as device, system, or method embodiments the exemplary embodiments can be implemented in various devices, systems, and methods.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIG. 6 is an example flow providing preclusive data compression failure operation for initiating compressor memory resets conditionally according to some aspects of the present disclosure.

FIG. 7 is an example flow providing preclusive data compression failure operation for configuring communication devices for data transmission recovery before reordering window timer expiration according to some aspects of the present disclosure.

DETAILED DESCRIPTION

Figure 1:
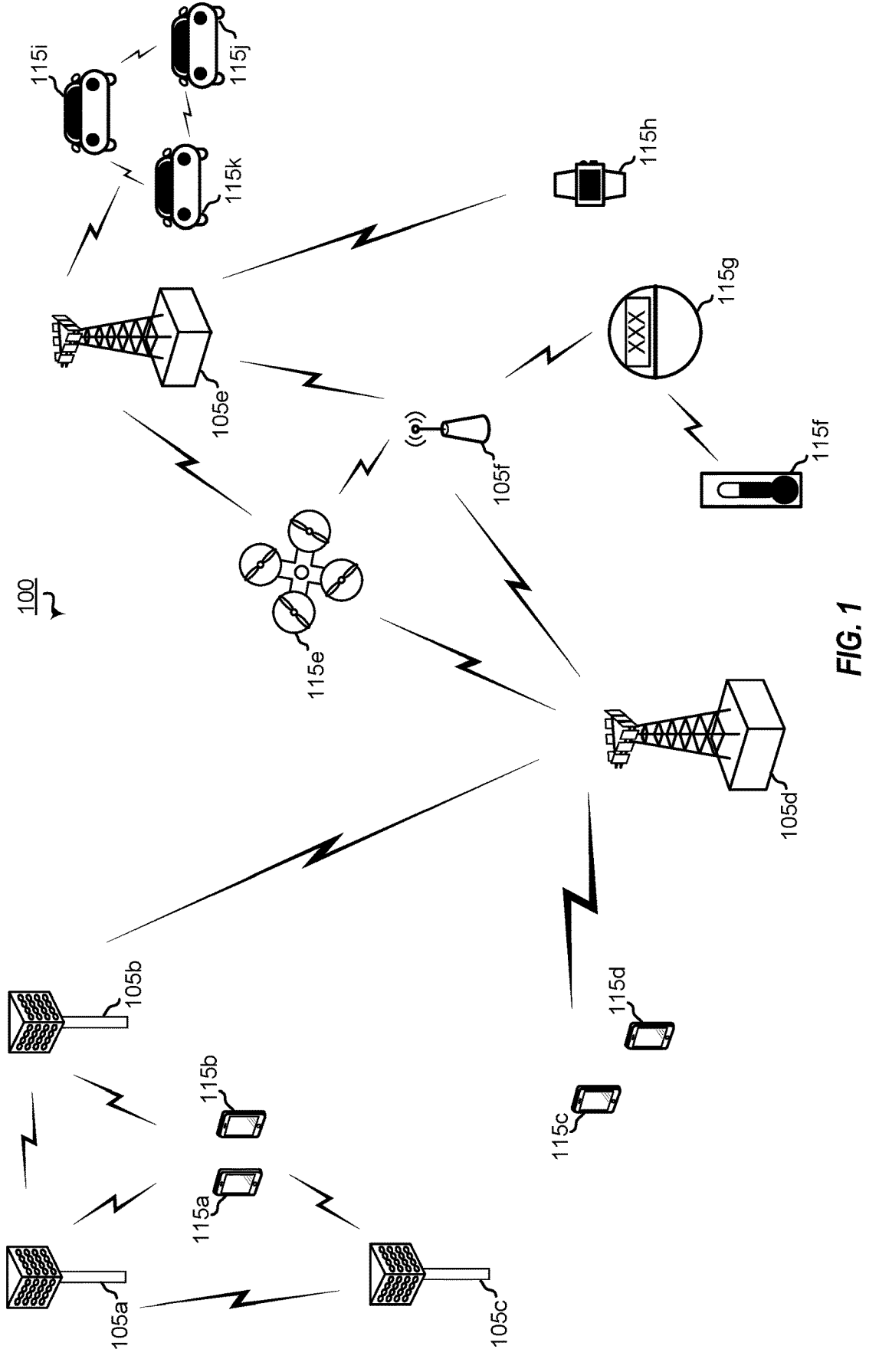
FIG. 1 is a block diagram illustrating details of a wireless communication system according to some embodiments of the present disclosure.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in communication as between two or more wireless devices in one or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, $5^{th}$ Generation (5G) or new radio (NR) networks (sometimes referred to as "5G NR" networks/systems/devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as GSM. 3GPP defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with Universal Terrestrial Radio Access Networks (UTRANs) in the case of a UMTS/GSM network. An operator network may also include one or more LTE networks, and/or one or more other networks. The various different network types may use different radio access technologies (RATs) and radio access networks (RANs).

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3$^{rd}$ Generation Partnership Project" (3GPP), and cdma2000 is described in documents from an organization named "3$^{rd}$ Generation Partnership Project 2" (3GPP2). These various radio technologies and standards are known or are being developed. For example, the 3$^{rd}$ Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1M nodes/km2), ultra-low complexity (e.g., ~10s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km2), extreme data rates (e.g., multi-Gbps rate, 100+ Mbps user experienced rates), and deep awareness with advanced discovery and optimizations.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD)/frequency division duplex (FDD) design; and advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

For clarity, certain aspects of the apparatus and techniques may be described below with reference to exemplary LTE implementations or in an LTE-centric way, and LTE terminology may be used as illustrative examples in portions of the description below; however, the description is not intended to be limited to LTE applications. Indeed, the present disclosure is concerned with shared access to wireless spectrum between networks using different radio access technologies or radio air interfaces, such as those of 5G NR.

Moreover, it should be understood that, in operation, wireless communication networks adapted according to the concepts herein may operate with any combination of licensed or unlicensed spectrum depending on loading and availability. Accordingly, it will be apparent to one of skill in the art that the systems, apparatus and methods described herein may be applied to other communications systems and applications than the particular examples provided.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and/or other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or OEM devices or systems incorporating one or more described aspects. In some practical settings, devices incorporating described aspects and features may also necessarily include additional components and features for implementation and practice of claimed and described embodiments. It is intended that innovations described herein may be practiced in a wide variety of implementations, including both large/small devices, chip-level components, multi-component systems (e.g. RF-chain, communication interface, processor), distributed arrangements, end-user devices, etc. of varying sizes, shapes, and constitution.

FIG. 1 shows wireless network 100 for communication according to some embodiments. Wireless network 100 may, for example, comprise a 5G wireless network. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Wireless network 100 illustrated in FIG. 1 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" can refer to this particular geographic coverage area of a base station and/or a base station subsystem serving the coverage area, depending on the context in which the term is used. In implementations of wireless network 100 herein, base stations 105 may be associated with a same operator or different operators (e.g., wireless network 100 may comprise a plurality of operator wireless networks), and may provide wireless communications using one or more of the same frequencies (e.g., one or more frequency bands in licensed spectrum, unlicensed spectrum, or a combination thereof) as a neighboring cell. In some examples, an individual base station 105 or UE 115 may be operated by more than one network operating entity. In other examples, each base station 105 and UE 115 may be operated by a single network operating entity.

A base station may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

Wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 115 are dispersed throughout the wireless network 100, and each UE may be stationary or mobile. It should be appreciated that, although a mobile apparatus is commonly referred to as user equipment (UE) in standards and specifications promulgated by the 3$^{rd}$ Generation Partnership Project (3GPP), such apparatus may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, a gaming device, an augmented reality device, vehicular component device/module, or some other suitable terminology. Within the present document, a "mobile" apparatus or UE need not necessarily have a capability to move, and may be stationary. Some non-limiting examples of a mobile apparatus, such as may comprise embodiments of one or more of UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an "Internet of things" (IoT) or "Internet of everything" (IoE) device such as an automotive or other transportation vehicle, a satellite radio, a global positioning system (GPS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 115a-115d of the embodiment illustrated in FIG. 1 are examples of mobile smart phone-type devices accessing wireless network 100 A UE may also be a machine specifically configured for connected communication, including machine type communication (MTC), enhanced MTC (eMTC), narrowband IoT (NB-IoT) and the like. UEs 115e-115k illustrated in FIG. 1 are examples of various machines configured for communication that access wireless network 100.

A mobile apparatus, such as UEs 115, may be able to communicate with any type of the base stations, whether macro base stations, pico base stations, femto base stations, relays, and the like. In FIG. 1, a lightning bolt (e.g., communication link) indicates wireless transmissions between a UE and a serving base station, which is a base station designated to serve the UE on the downlink and/or uplink, or desired transmission between base stations, and backhaul transmissions between base stations. UEs may operate as base stations or other network nodes in some scenarios. Backhaul communication between base stations of wireless network 100 may occur using wired and/or wireless communication links.

In operation at wireless network 100, base stations 105a-105c serve UEs 115a and 115b using 3D beamforming and coordinated spatial techniques, such as coordinated multi-point (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

Wireless network 100 of embodiments supports mission critical communications with ultra-reliable and redundant links for mission critical devices, such UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through wireless network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. Wireless network 100 may also provide additional network efficiency through dynamic, low-latency TDD/FDD communications, such as in a vehicle-to-vehicle (V2V) mesh network between UEs 115i-115k communicating with macro base station 105e.

Figure 2:
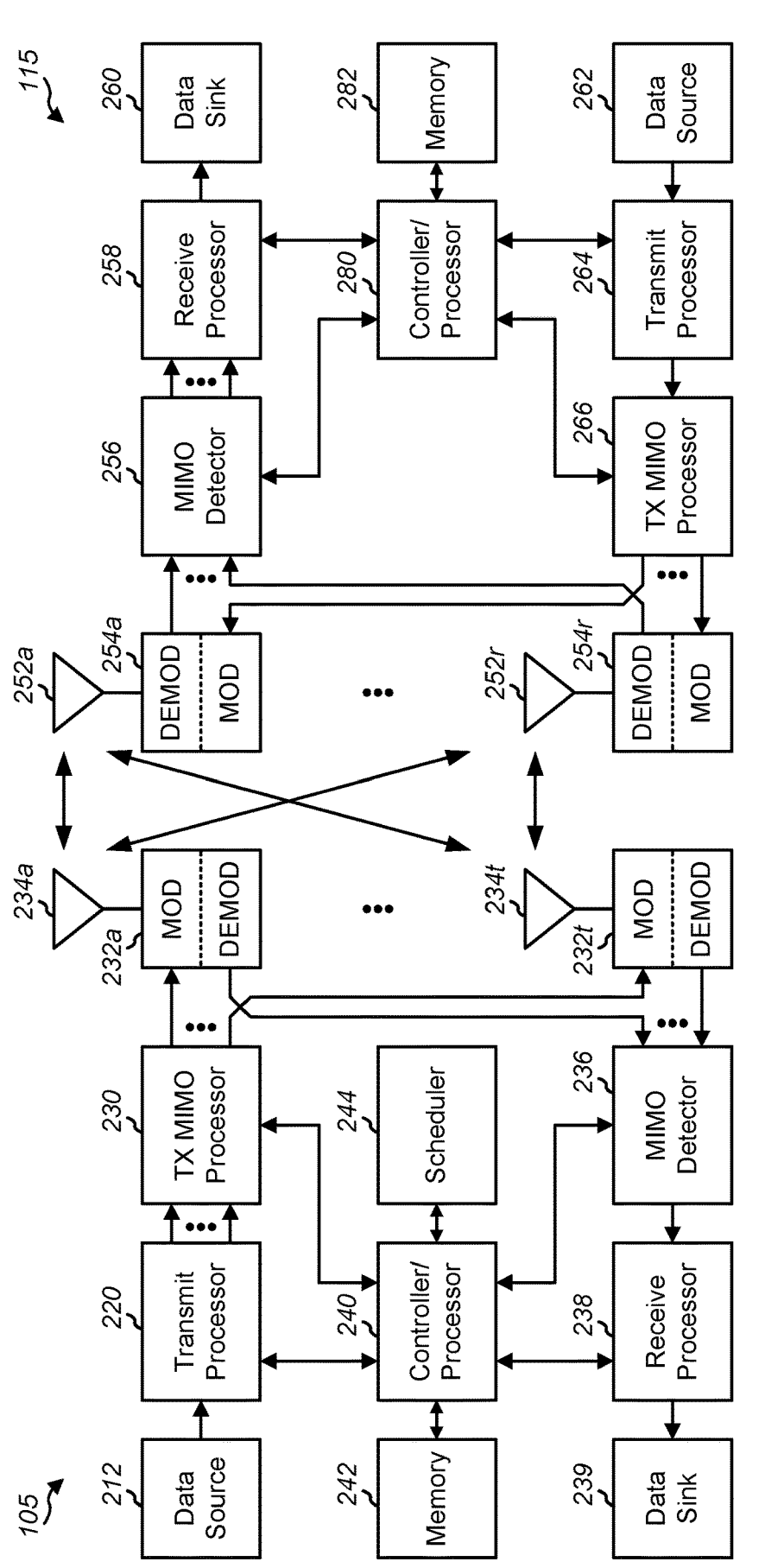
FIG. 2 is a block diagram conceptually illustrating a design of a base station and a UE configured according to some embodiments of the present disclosure.

FIG. 2 shows a block diagram of a design of a base station 105 and a UE 115, which may be any of the base stations and one of the UEs in FIG. 1. For a restricted association scenario (as mentioned above), base station 105 may be small cell base station 105f in FIG. 1, and UE 115 may be UE 115c or 115D operating in a service area of base station 105f, which in order to access small cell base station 105f, would be included in a list of accessible UEs for small cell base station 105f. Base station 105 may also be a base station of some other type. As shown in FIG. 2, base station 105 may be equipped with antennas 234a through 234t, and UE 115 may be equipped with antennas 252a through 252r for facilitating wireless communications.

At base station 105, transmit processor 220 may receive data from data source 212 and control information from controller/processor 240. The control information may be for the physical broadcast channel (PBCH), physical control format indicator channel (PCFICH), physical hybrid-ARQ (automatic repeat request) indicator channel (PHICH), physical downlink control channel (PDCCH), enhanced physical downlink control channel (EPDCCH), MTC physical downlink control channel (MPDCCH), etc. The data may be for the PDSCH, etc. Transmit processor 220 may process (e.g., encode and symbol map) the data and control information to obtain data symbols and control symbols, respectively. Transmit processor 220 may also generate reference symbols, e.g., for the primary synchronization signal (PSS) and secondary synchronization signal (SSS), and cell-specific reference signal. Transmit (TX) multiple-input multiple-output (MIMO) processor 230 may perform spatial processing (e.g., precoding) on the data symbols, the control symbols, and/or the reference symbols, if applicable, and may provide output symbol streams to modulators (MODs) 232a through 232t. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232a through 232t may be transmitted via antennas 234a through 234t, respectively.

At UE 115, the antennas 252a through 252r may receive the downlink signals from base station 105 and may provide received signals to demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from demodulators 254a through 254r, perform MIMO detection on the received symbols if applicable, and provide detected symbols. Receive processor 258 may process (e.g., demodulate, deinterleave, and decode) the detected symbols, provide decoded data for UE 115 to data sink 260, and provide decoded control information to controller/processor 280.

On the uplink, at UE 115, transmit processor 264 may receive and process data (e.g., for the physical uplink shared channel (PUSCH)) from data source 262 and control information (e.g., for the physical uplink control channel (PUCCH)) from controller/processor 280. Transmit processor 264 may also generate reference symbols for a reference signal. The symbols from transmit processor 264 may be precoded by TX MIMO processor 266 if applicable, further processed by modulators 254a through 254r (e.g., for SC-FDM, etc.), and transmitted to base station 105. At base station 105, the uplink signals from UE 115 may be received by antennas 234, processed by demodulators 232, detected by MIMO detector 236 if applicable, and further processed by receive processor 238 to obtain decoded data and control information sent by UE 115. Processor 238 may provide the decoded data to data sink 239 and the decoded control information to controller/processor 240.

Controllers/processors 240 and 280 may direct the operation at base station 105 and UE 115, respectively. Controller/processor 240 and/or other processors and modules at base station 105 and/or controller/processor 280 and/or other processors and modules at UE 115 may perform or direct the execution of various processes for the techniques described herein, such as to perform or direct the execution illustrated in FIGS. 6 and 7, and/or other processes for the techniques described herein. Memories 242 and 282 may store data and program codes for base station 105 and UE 115, respectively. Scheduler 244 may schedule UEs for data transmission on the downlink and/or uplink.

The wireless devices (e.g., base stations 105, UEs 115, etc.) of wireless network 100 may utilize various compression techniques, such as to facilitate efficient spectrum usage. It may, for example, be beneficial to compress data before transmission where the air interface would otherwise become congested. As an example, in a situation where a downlink-heavy TDD configuration is implemented, the smaller portion of resources allocated for use in the uplink air interface may become congested. Uplink data compression (UDC) techniques, such as adaptive packet data compression (APDC) and Deflate, may be utilized by UEs 115 to mitigate or reduce the congestion.

Both Deflate and APDC use the LZ77 compression algorithm which provides lossless data compression. Deflate further uses Huffman coding, which provides variable length encoding, to further compress some of the parameters and output of the LZ77 compression algorithm.

Figure 3:
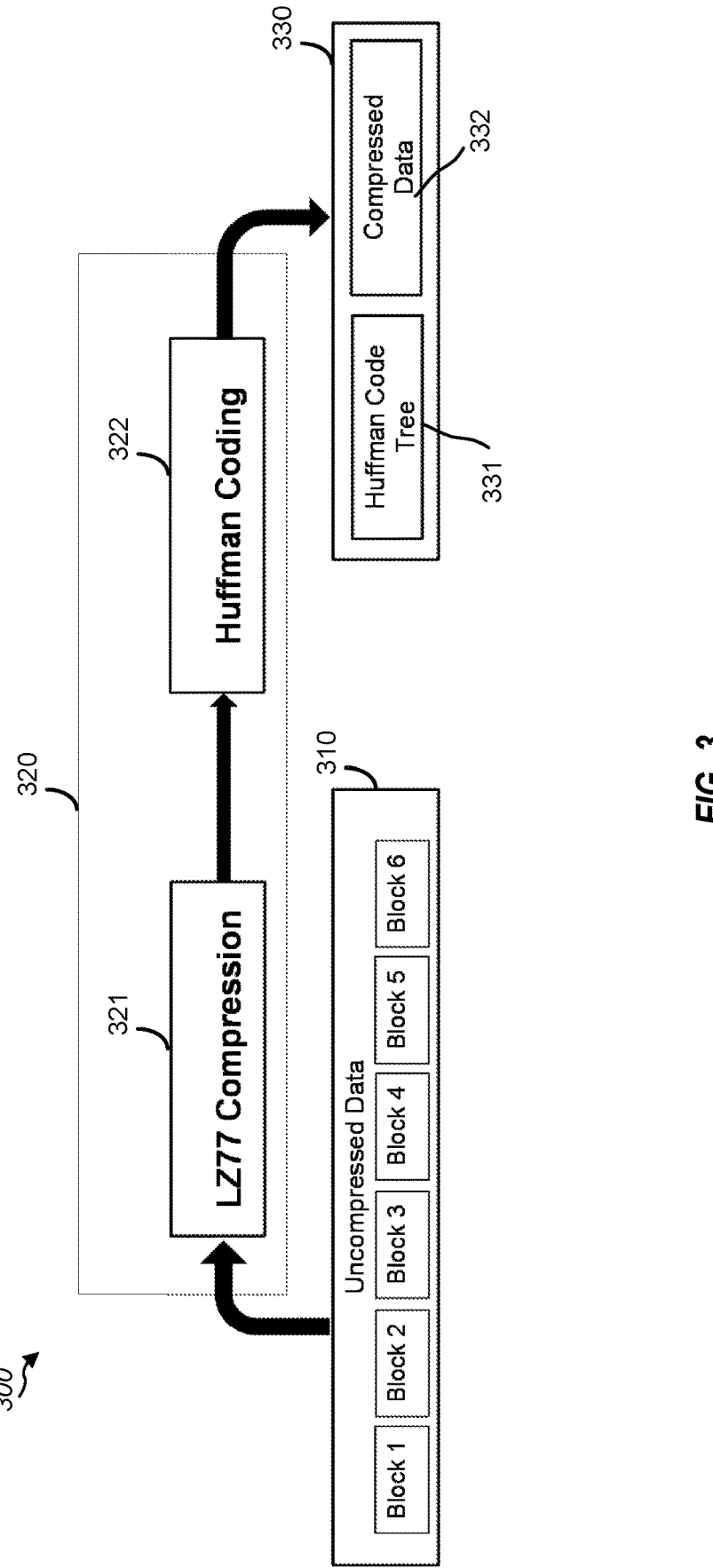
FIG. 3 shows operation according to the Deflate compression technique, as may be implemented according to some embodiments of the present disclosure.

FIG. 3 shows operation according to the Deflate compression technique, such as may be implemented by wireless devices (e.g., base stations 105, UEs 115, etc.) of wireless network 100. As shown in FIG. 3, uncompressed data input 310 (e.g., application and/or control data to be transmitted in an uplink by UE 115) is compressed by Deflate compression logic 320 (e.g., as may be executed by controller/processor 280 and/or transmit processor 264 of UE 115) to provide compressed data output 330 for transmission.

In the illustrated example, uncompressed data input 310 is divided into series of consecutive blocks. The block sizes may be arbitrary, although a maximum size for non-compressible blocks (e.g., maximum non-compressible block size of 65,535 bytes) may be imposed.

Each bock of uncompressed data input 310 is passed through LZ77 compression algorithm 321 of Deflate compression logic 320 to provide lossless compression of the data. LZ77 compression algorithm 321 may achieve compression by replacing repeated occurrences of data with references to a single copy of that data existing earlier in the uncompressed data stream. A match may be encoded by a pair of numbers called a length-distance pair (distance is also referred to as offset). The LZ77 compression algorithm may use such references to duplicated strings in a previous block (e.g., referring back up to 32K preceding input bytes).

In addition to LZ77 compression algorithm 321, the data is passed through Huffman coding 322 to further compress the output of LZ77 compression algorithm 321 using variable length encoding. The output from Huffman coding 322 may be viewed as a variable-length code table for encoding a source symbol, wherein the variable-length codes are derived from the estimated probability or frequency of occurrence (weight) for each possible value of the source symbol. In operation of Huffman coding 322 of Deflate compression logic 320, Huffman code trees which describe the representation of the compressed data are generated, wherein Huffman code trees for each block are independent of other blocks.

Compression of a block of uncompressed data input 310 by Deflate compression logic 320 provides compressed data output including two parts. For example, as shown in FIG. 3, compressed data output 330 includes Huffman code tree 331 and compressed data 332. Compressed data 332 may include literal bytes as well as pointers to duplicate strings. Literal bytes may, for example, comprise data strings which cannot be duplicated based on the preceding data (e.g., data which is not a repeated occurrence of data present within the previous 32 KB of data). Pointers to duplicate strings may, as described above, comprise a length-distance pair (e.g., maximum length of 258 bytes and maximum distance of 32 KB). Huffman code tree 331 may provide encoding with respect to each of the aforementioned literal bytes and pointers. For example, one Huffman code tree may be provided for literal bytes and length and another Huffman code tree may be provided for distances. Compressed data output 330 may thus comprise Huffman code trees (e.g., compact form) and compressed data.

Decompression of data compressed by operation of Deflate compression logic 320 follows the Huffman code trees of compressed data output 330 to recover the literal bytes, length, and distance data. Where data is repeated, the distance data may reference data of a preceding block of data (e.g., looking back up to a maximum distance amount, such as a maximum distance of 32 KB). However, even when data within a particular block of compressed data output 330 is extracted, the data may not be successfully decompressed due to a failure with respect to referencing the data of a preceding block of compressed data output 330. For example, blocks of compressed data output 330 including an instance of a data string and one or more reference to a single copy of that data may exceed a decoding window implemented by a wireless device (e.g., base station 105, UE 115, etc.) receiving the compressed data transmission, such that the reference to a preceding block fails. That is, decompression failure may result despite a particular block having been received and the data carried therein extracted due to the compression technique relying upon data of a preceding, currently unavailable, block of the compressed data.

Radio link control (RLC) acknowledgment mode (AM) implemented by wireless devices of some NR networks provides an example of the foregoing decompression failure scenario. NR RLC AM recovers missing packets through a RLC ARQ mechanism, wherein packets are delivered out-of-order to the NR packet data convergence protocol (PDCP). NR RLC AM operation facilitates the NR PDCP split bearer (e.g., master cell group (MSG)/secondary cell group (SCG) bearers) case when data is arriving through media access control (MAC) and RLC entities. NR PDCP utilizes a reordering window and timer mechanism to accommodate the out-of-order packets. For example, a reordering window establishes a timeframe in which packets are received for reordering and providing to an upper layer. When the timer (referred to herein as a Treordering timer) expires, the received data packets in the PDCP buffer are provided to an upper layer of the wireless device.

Expiration of the Treordering timer moves the reordering window to the next window timeframe (e.g., based on state variables) and delivers packets to upper layers. After the reordering window movement, NR PDCP discards later received packets falling outside of the reordering window timeframe as "out-of-window." Thus, even though NR RLC AM may recover packets lost in transmission through the ARQ mechanism, these packets may nevertheless be received outside of an updated reordering window timeframe and be dropped as being out-of-window. The packets as delivered to upper layers may thus be delivered with some holes.

Figure 4:
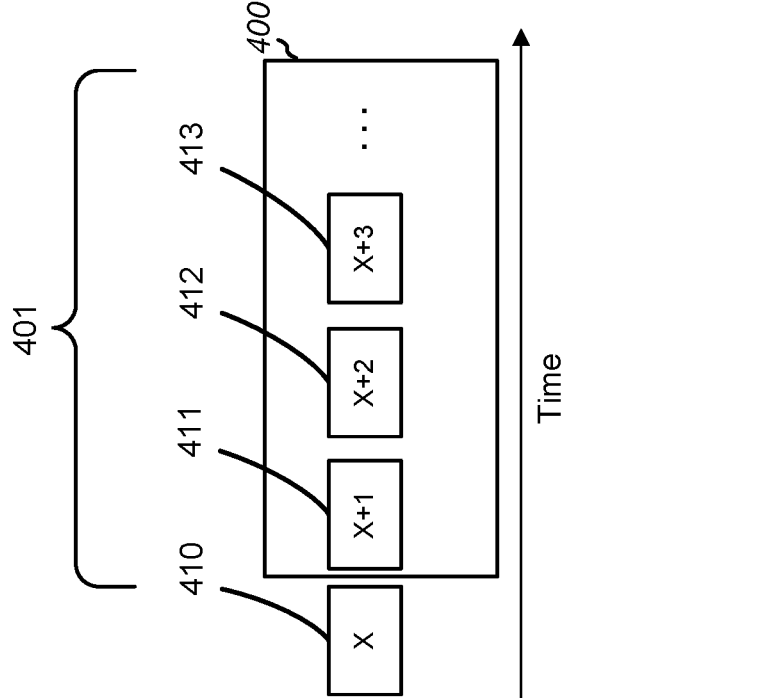
FIG. 4 shows an example decompression failure scenario, as may be experienced according to some embodiments of the present disclosure.

In a situation where data compression based on Deflate is used with respect to NR PDCP, if the previous packets are lost, a current PDCP packet may not be able to successfully decompressed. This decompression failure scenario is illustrated in of FIG. 4. In the example of FIG. 4, a wireless device (e.g., base station 105, UE 115, etc.) implements reordering window 400 spanning timeframe 401. Compressed data blocks 410-413 may each comprise an instance of Huffman code trees 331 and compressed data 332 corresponding to a respective data block of uncompressed data input 310 described above with reference to FIG. 3. In the illustrated example, compressed data block 410 (sequence number (SN) X) is out-of-window with respect to reordering window 400. Compressed data block 411 (SN X+1) is, however, received within reordering window 400. If compressed data block 411 (SN X+1) includes compressed data whose distance of the length-distance pair is pointing to data in compressed data block 410 (SN X), compressed data block 411 (SN X+1) is not able to be properly decompressed. Thus, a decompression failure may be experienced with respect to compressed data block 411 (SN X+1).

The foregoing decompression failure may extend beyond not being able to properly decompress compressed data block 411 (SN X+1). For example, although compressed data blocks 412 (SN+2) and 413 (SN+3) may be properly received, these compressed data blocks may include an instance of data corresponding to the data of compressed data block 411 (SN X+1) whose distance of a length-distance pair is pointing data in compressed data block 410 (SN X). The decompression failure may thus cascade with respect to a number of the compressed data blocks.

Various techniques may be utilized to detect compressor-decompressor desynchronization, such as may result from decompression failure. For example, a checksum-based technique to identify compressor-decompressor desynchronization may be implemented by wireless devices utilizing compression for data communication. Compressor-decompressor desynchronization may be identified based on a checksum calculated on the compressor memory, not meeting the checksum received in a current packet. As used herein, compressor memory refers to memory utilized by a compressor in compressing data or a decompressor in decompressing data.

Signaling may be provided between wireless devices utilizing compression for data communication to indicate resetting of a compression buffer, such as when compressor-decompressor desynchronization is detected. For example, a UDC header may contain a reset bit to inform a decompressor at a wireless device receiving compressed data that the compression buffer of a wireless device transmitting the compressed data has been reset. A validation (e.g., checksum) of the compression buffer may also be contained in a UDC header, such as may be used to resolve mismatch (if any) between the compression and de-compression buffers. In one example, a UDC checksum error notification PDCP control PDU may indicate the compression buffer and de-compression buffer are out of synchronization, wherein a wireless device receiving the notification triggers UDC buffer reset procedure to resynchronize the compression buffer.

As an example of a checksum used for compression buffer validation, a checksum field of NR RLC, PDCP comprises a 4 bit field containing validation bits for the compression buffer content, wherein the checksum is calculated by the content of current compression buffer before the current packet is put into buffer. The checksum is derived from the values of the first 4 bytes and the last 4 bytes in the whole compression buffer. In particular, each byte is divided into two 4-bit numbers, the 16 4-bit numbers are added together to obtain a sum, and the checksum is one's complement of the right-most 4 bits (i.e. 4 LSB) of the sum. The checksum error notification field (FE field) of NR RLC, PDCP is used to provide an indication of whether checksum error is detected or not. In particular, a FE field value of "0" indicates that a checksum error is not detected, and a FE field value of "1" indicates that a checksum error is detected and the wireless device is to reset the compression buffer. The compression buffer reset field (FR field) of NR RLC, PDCP is used (e.g., FR field bit value of "1") to control a compressor memory reset, such as in response to receiving an indication of compression buffer validation failure (e.g., FE field bit value of "1").

Figure 5:
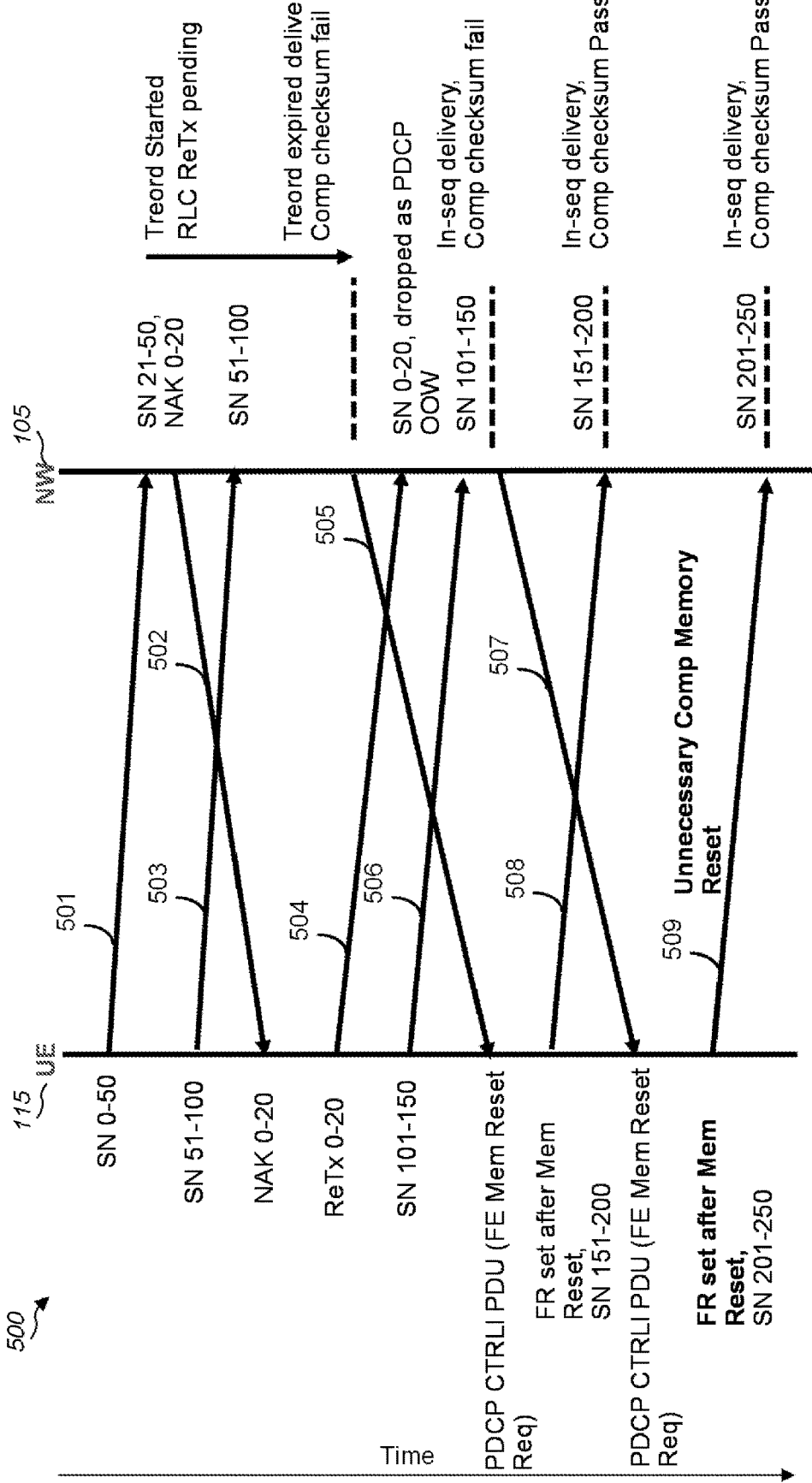
FIG. 5 shows a ladder diagram illustrating decompression failure, as may be experienced according to some embodiments of the present disclosure.

FIG. 5 shows a ladder diagram illustrating NR RLC, PDCP operation providing communication of compressed data in which decompression failure is experienced. In particular, ladder diagram 500 of FIG. 5 illustrates timing of communications between wireless devices communicating compressed data via one or more communication links of wireless network 100. For example, UDC may be implemented with respect to an uplink established between UE 115 and a network node, such as base station 105. In the illustrated example it is assumed that the RLC and PDCP SNs are the same for simplifying the example. The Treordering timer (reordering window timer) duration of the example is 100 ms.

In the example of FIG. 5, UE 115 sends compressed data blocks SNs 0-50 to base station 105 at times T0-T10 (transmissions 501). Base station 105 receives compressed data blocks SNs 21-50, and requests retransmission of compressed data blocks SNs 0-20 through RLC ARQ (transmission 502), and the PDCP reordering timer (Treordering timer) is started, at time T10. UE 115 sends compressed data blocks SNs 51-100 to base station 105 at times T60-T70 (transmission 503). Thereafter, UE 115 receives the retransmission request from base station 105 for retransmission of compressed data blocks SNs 0-20, and UE resends compressed data blocks SNs 0-20 to base station 105 (transmission 504) at times T110-T120. In the example of FIG. 5, base station 105 and UE 115 are performing RLC ARQ without success at times T10-T110.

The PDCP reordering timer (Treordering timer) implemented by base station 105 expires at time T110. Accordingly, compressed data blocks SNs 21-100 (missing compressed data blocks SNs 0-20 as being out-of-window) are given for decompression. Decompression failures are experienced by base station 105 due to data from one or more of compressed data blocks SNs 0-20 missing in its decompressor memory for backward lookup at time T111. Base station 105 sends a request to reset the compressor memory to UE 115 by transmitting a PDCP control PDU containing a compressor memory reset request (e.g., FE field value of "1") at time T112 (transmission 505).

UE 115 sends compressed data blocks SNs 101-150 to base station 105 at times T160-T170 (transmission 506), and later receives the request to reset the compressor memory and resets the compressor memory context at time T175. Base station 105 receives compressed data blocks SNs 101-150 which are given for decompression upon a subsequent expiration of the PDCP reordering timer (Treordering timer). Although compressed data blocks SNs 101-150 are delivered in sequence, the compressor checksum fails due to transmission by UE 115 prior to receiving the request to rest its compressor memory and decompression failures are experienced by base station 105. Base station 105 sends another request to reset the compressor memory to UE 115 by transmitting a PDCP control PDU containing a compressor memory reset request (e.g., FE field value of "1") at time T205 (transmission 507).

UE 115 sends compressed data blocks SNs 151-200 accompanied by a compressor memory reset (e.g., FR field bit value of "1") to base station 105 at times T210-T220 (transmission 508), and later receives the re-request to reset the compressor memory and resets the compressor memory context at time T235. Base station 105 receives compressed data blocks SNs 151-200 which are given for decompression upon a subsequent expiration of the PDCP reordering timer (Treordering timer). Compressed data blocks SNs 151-200 are delivered in sequence and the compressor checksum passes due to the compressor memory of UE 115 having been reset prior to transmitting compressed data blocks SNs 151-200. Nevertheless, UE 115 thereafter receives the re-request to reset the compressor memory and resets the compressor memory context. UE 115 thereafter sends compressed data blocks SNs 201-250 accompanied by a compressor memory reset (e.g., FR field bit value of "1") to base station 105 (transmission 509). This compressor memory reset is, however, unnecessary, likely resulting in inefficient data compression operation.

In the example of FIG. 5, a cycle of compressor memory resets are performed even though many compressed data blocks are properly decoded. In particular, UE 115 unnecessarily resets the compressor memory, even though base station 105 successfully decompresses compressed data blocks it has received.

Embodiments of the present disclosure are configured to provide preclusive data decompression failure techniques. Preclusive data decompression failure techniques implemented in accordance with concepts described herein may, for example, be utilized to avoid decompression failures and/or unnecessary compressor memory resets. In accordance with some aspects of the disclosure, data decompression failures and associated requests for compressor memory resets may be avoided using predictive decompression failure indications and/or configuring communication devices for data transmission recovery before reordering window timer expiration.

In operation of a preclusive data decompression failure technique using one or more predictive decompression failure indications according to some aspects of the disclosure, a wireless device (e.g., UE 115, base station 105, etc.) initiates compressor memory resets conditionally, such as in correspondence to or otherwise based at least in part on one or more trigger events. For example, a UE may initiate compressor memory resets conditionally with respect to UDC based on one or more trigger events to limit the impact of packet loss at UE PDCP.

Trigger events of the one or more trigger events utilized according to embodiments predictively indicate decompression failure. Trigger events that predictively indicate decompression failures according to embodiments of the disclosure may, for example, comprise one or more events selected, identified, or otherwise designated as providing a priori indication of decompression failure at another communication device, such as without the other communication device providing corresponding signaling to control a compressor memory reset. For example, a trigger event may indirectly indicate the possibility of a reordering window timer failure at PDCP. A trigger event may predictively indicate decompression failure due to reordering window timer expiration at the wireless device receiving compressed data (e.g., compressor memory reset triggered by events indicating Treordering timer expiration with compressed data blocks out-of-window).

In an example, a trigger event may correspond to a reconfiguration between use of split radio bearers and use of non-split radio bearers. Compressor memory reset may, for example, be triggered on every reconfiguration from split radio bear to non-split radio bearer and from non-split radio bearer to split radio bearer using a radio bearer reconfiguration trigger event of some embodiments.

In another example, a trigger event may correspond to a SCG radio link failure (RLF). Compressor memory reset may be triggered on every SCG RLF using a SCG RLF trigger event of some embodiments.

As a further example, a trigger event may correspond to one or more RLC layer ARQ metrics measured by a wireless device transmitting compressed data (e.g., UE 115, base station 105, etc.). To illustrate an RLC layer ARQ metric as may be utilized as a trigger event, assume a reordering window timer (Treordering) duration is 100 ms, RLC round trip time (RTT) is approximately 15 ms, and status prohibit is 40 ms. A wireless device receiving compressed data that requests the same NAK a second time will likely experience reordering window timer expiration prior to receiving the retransmitted compressed data blocks (15+40+15+40+ 15>100). Accordingly, the wireless device transmitting the compressed data may compute RLC ARQ metrics, such as RTT versus reordering window timer (Treordering timer) duration metrics determined based on NAKs, delays in status, etc., to be used as one or more RLC ARQ trigger event. Compressor memory reset may thus be triggered using the RLC ARQ metrics, such as when the RLC ARQ metrics indicate a situation in which reordering window timer expiration prior to receiving retransmitted compressed data blocks.

In still another example, a trigger event may correspond a MAC metric and/or a hybrid automated repeat request (HARQ) metric measured by a wireless device transmitting compressed data (e.g., UE 115, base station 105, etc.) To illustrate, MAC metrics such as uplink and/or downlink metrics and/or HARQ metrics such as decoding failures may indicate a relatively high block error rate (BLER) or BLER exceeding a threshold (e.g., TBLER). For example, even a slight BLER at 8 component carriers typically results in a very large packet loss and usually peak rates has tight timing control. Compressor memory reset may thus be triggered using MAC metrics and/or HARQ metrics, such as when the MAC/HARQ metrics indicate a situation in which decompression failures are likely.

As another example, a trigger event may correspond to a scheduling delay during an outstanding retransmission and/ or a RLC layer status not being received by a wireless device transmitting compressed data. For example, a threshold (e.g., $T_{SchedDely}$) amount of scheduling delays during outstanding retransmission of compressed data in an uplink and/or RLC status not received in in a downlink may provide one or more trigger events. To illustrate, no RLC STATUS PDU in the downlink for some threshold amount of time (e.g., $T_{SchedDely}$=70 ms, with Treordering=100 ms, RTT=15 ms, and StatusProh=40 ms) may indicate a high likelihood that NAK is not recovered in time. Compressor memory reset may thus be triggered using scheduling delay during an outstanding retransmission and/or a RLC layer status not being received.

Trigger events, such as the example trigger events described above, may be utilized according to a preclusive data decompression failure technique to provide dynamic compressor memory reset (e.g., reset of compressor memory on meeting any of the above trigger events). Embodiments may initiate relatively frequent compressor memory resets, resulting in reduced overall compression gains, using one or more of the trigger events. For example, a plurality of the foregoing trigger events may be utilized for preclusive data decompression failure operation which initiates relatively frequent compressor memory resets. Additionally or alternatively, static compressor memory resets may be implemented according to some aspects of the disclosure. For example, in addition to the conditional compressor memory resets implemented using one or more trigger events, static compressor memory resets may be initiated in correspondence to or based at least in part upon various defined actions.

In an example, a static compressor memory reset may be provided periodically. For example, compressor memory may be reset every $N^{th}$ PDCP packet. In accordance with some aspects, every $N^{th}$ PDCP packet may be generated with a compression reset (e.g., informed through the FR field). N may, for example, be dependent on a configured value, a current throughput rate, MAC transport block (TB) size, PDCP/RLC configurations (timers, counters, etc.), and/or the like. As an example, N may be on the order of 100 packets, wherein N may be lower when a PDCP reordering timer is low.

FIG. 6 illustrates example preclusive data compression failure operation for initiating compressor memory resets conditionally according to some aspects of the present disclosure. In particular, flow 600 of FIG. 6 shows the use of trigger events to predictively indicate decompression failure according to some aspects of the present disclosure. Functions of the blocks shown in FIG. 6 may be implemented by wireless devices (e.g., base stations 105, UEs 115, etc.) of wireless network 100. In accordance with some embodiments, functions of flow 600 may be performed in whole or in part by logic of one or more processors (e.g., controller/processor 240 of base station 105, controller/ processor 280 of UE 115, etc.) of a wireless device communicating compressed data via one or more communication links of wireless network 100.

At block 601 of example flow 600, an occurrence of a trigger event of a plurality of trigger events may be detected. The trigger events may, for example, predictively indicate decompression failure at a second device receiving transmission from a first device in the wireless network. In accordance with some aspects of the disclosure, logic of a first device transmitting in a wireless network may detect or otherwise determine the occurrence of the trigger event. In an example where UDC is implemented, logic of a UE transmitting in an uplink to a base station may analyze one or more aspect (e.g., radio bearer configuration/reconfiguration, SCG RLF metrics, RLC ARQ metrics, MAC metrics, HARQ metrics, RTT metrics, RLC status metrics, etc.) with respect to the communication link and detect an occurrence of a trigger event. The trigger event may, for example, comprise a radio bearer reconfiguration trigger event, a SCG RLF trigger event, a RLC ARQ trigger event, a MAC trigger event, a HARQ trigger event, a RLC status trigger event, etc., and combinations thereof.

A compressor reset for the transmission may be signaled in correspondence to detecting the occurrence of the trigger event (e.g., based at least in part on detecting or otherwise determining the occurrence of the trigger event), at block 602. A compressor reset may, for example, be signaled by a first device transmitting to a second device in a wireless network. In accordance with some aspects of the disclosure, a first device may signal a compressor memory reset using one or more reset bits to indicate the compressor memory reset. In an example where UDC is implemented, a UE transmitting in an uplink to a base station may transmit (e.g., using transmit processor 264, TX MIMO processor 266, and/or MODs 254a-254r, and antennas 252a-252r, such as under control of controller/processor 280) a UDC header containing a reset bit to inform a decompressor at a base station receiving compressed data that the compression buffer of the UE has been reset to initiate a corresponding compressor memory reset at the base station. A validation (e.g., checksum) of the compression buffer may also be contained in a UDC header, such as may be used to resolve mismatch (if any) between the compression and de-compression buffers.

Preclusive data decompression failure techniques configured to avoid decompression failures and/or unnecessary compressor memory resets according to some aspects of the disclosure may include configuring communication devices for transmission recovery before reordering window timer expiration. For example, in addition to or in the alternative to using predictive decompression failure indications embodiments may configure one or more wireless devices communicating compressed data for transmission recovery before reordering window timer expiration.

In an example, a wireless device (e.g., base station 105, UE 115, etc.) receiving compressed data may implement an increased reordering window timer (e.g., Treordering timer) duration (e.g., implement timer duration that is larger than initially or natively configured). A reordering window timer duration may, for example, be reconfigured by the receiver to provide an increased duration allowing or facilitating more time to recover data through retransmissions at the RLC/MAC level. For example, the reordering window timing duration may be configured (e.g., increased) dynamically at a receiver in correspondence with MAC/RLC BLER conditions (e.g., based at least in part on MAC/RLC BLER conditions). In accordance with some aspects of the disclosure, the reordering window timer duration may be configured based on a value configured to be large enough to accommodate HARQ retransmission and RLC retransmission delays. The reordering window timer duration may, in some examples, be increased by a multiplier value (e.g., a preset value internal to the wireless device, a value configurable by the RAN, a value indicated by MAC CE, etc.). The value of such a multiplier may, for example, be selected based upon various aspects of the wireless device(s), application(s) providing and/or consuming the data, communications, data compression, and/or the like, such as the tolerance to latency and/or data transmission errors by a particular application, the RTT of the communication link, etc. In accordance with some aspects of the disclosure, the reordering window timer duration may be increased to a default large value, such as infinity.

In another example, a wireless device (e.g., base station 105, UE 115, etc.) transmitting compressed data may be configured for prioritization to provide transmission recovery before reordering window timer expiration at a wireless device (e.g., base station 105, UE 115, etc.) receiving the compressed data. For example, bearer channel/logical channel (LC) specific data may be prioritized to ensure quick recovery before PDCP reordering window timer expiration. In accordance with some aspects of the disclosure, RLC layer level retransmissions of a bearer carrying compressed data may be prioritized over transmissions of one or more other bearers. For example, RLC level retransmissions may be prioritized beyond regular configuration, such as to facilitate fast retransmissions for compressed bearer only. Additionally or alternatively, a MAC level grant associated with the data may be prioritized. For example, MAC level grants for retransmission may be prioritized using more opportunities with logical channel priority (LCP), prioritized bit rate (PBR), bucket size duration (BSD), logical channel bucket contents value (Bj).

The foregoing techniques for configuring communication devices for data transmission recovery before reordering window timer expiration may be implemented for particular situations, such as based upon the wireless device(s), application(s) providing and/or consuming the data, communications, data compression, and/or the like. For example, one or more such configuration technique may be implemented for compressed data transmission with respect to applications which benefit from higher compression gain and/or which have relaxed latency requirements. Configuration of communication devices for transmission recovery before reordering window timer expiration according to some aspects of the disclosure may, for example, be performed upon compression configuration for the specific radio bearer.

FIG. 7 illustrates example preclusive data compression failure operation for configuring communication devices for data transmission recovery before reordering window timer expiration according to some aspects of the present disclosure. In particular, flow 700 of FIG. 7 shows configuration of a wireless device for prioritization to provide data transmission recovery before reordering window timer expiration according to some aspects of the present disclosure. Functions of the blocks shown in FIG. 7 may be implemented by wireless devices (e.g., base stations 105, UEs 115, etc.) of wireless network 100. In accordance with some embodiments, functions of flow 700 may be performed in whole or in part by logic of one or more processors (e.g., controller/processor 240 of base station 105, controller/processor 280 of UE 115, etc.) of a wireless device communicating compressed data via one or more communication links of wireless network 100.

At block 701 of example flow 700, one or more radio bearers for transmission from a first device in a wireless network to a second device in the wireless network may be identified. For example, one or more radio bearers (e.g., split radio bearers of MSG and SCG bearers, non-split radio bearers of MSG or SCG bearers, etc.) may be identified or otherwise determined for use with respect to a NR PDCP communication link in which data compression is to be implemented. Base station 105 may, for example, select one or more radio bearers for use with respect to a communication link implemented with respect to UE 115, wherein the selected radio bearer(s) may be indicated to the UE via signaling (e.g., RRC, DCI, etc.).

A first device may be configured for compression of data to be transmitted via the one or more radio bearers at block 702. In accordance with some aspects of the disclosure, a wireless device (e.g., base station 105, UE 115, etc.) to be transmitting compressed data is configured for compression of the data. Configuring the first device may, for example, include establishing prioritization for some data to provide data transmission recovery before reordering window timer expiration at the second device. For example, when configuring a wireless device (e.g., UE 115) for transmitting compressed data (e.g., UDC), the wireless device may be configured for prioritization to provide transmission recovery before reordering window timer expiration at another wireless device (e.g., base station 105) receiving the compressed data. In some examples, wireless devices may be configured for establishing prioritization for some data by prioritizing RLC layer level retransmissions of a bearer carrying compressed data over transmissions of one or more other bearers. Additionally or alternatively, wireless devices may be configured for establishing prioritization for some data by prioritizing a MAC level grant associated with the data. In accordance with some aspects of the disclosure, the prioritization for some data provides compression gain configured for a particular application associated with the data. Additionally or alternatively, the prioritization for some data is configured in accordance with tolerance to latency by a particular application associated with the data.

Configuring communication devices for transmission recovery before reordering window timer expiration may include configuring one or more wireless devices in addition to or in alternative to prioritization configuration of the example of FIG. 7. For example, a wireless device (e.g., base station 105, UE 115, etc.) to be to be receiving compressed data may be configured to increase a duration of a reordering window timer according to some aspects of the present disclosure.

Figure 8:
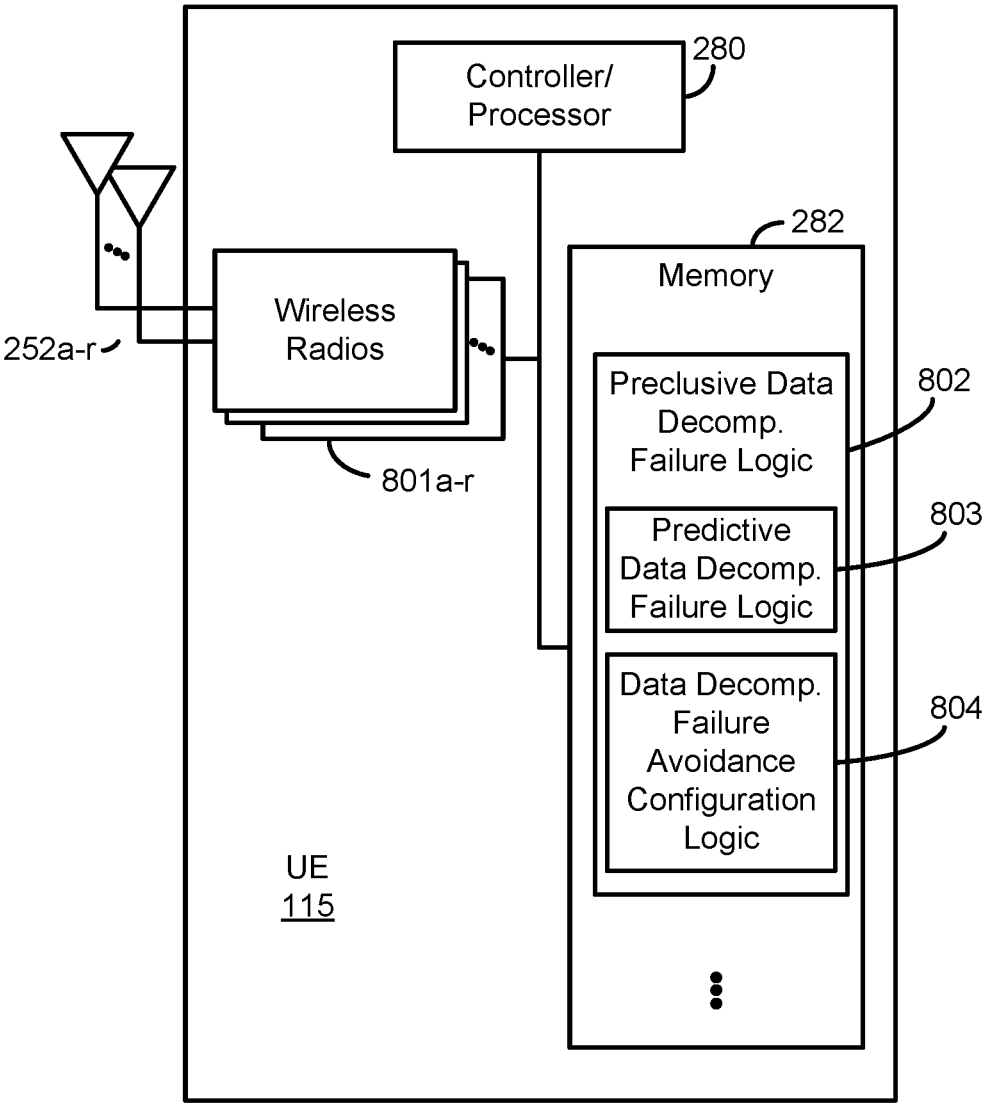
FIG. 8 is a block diagram conceptually illustrating a design of a UE configured for preclusive data compression failure operation according to some embodiments of the present disclosure.

FIG. 8 is a block diagram illustrating UE 115 configured according to one aspect of the present disclosure. UE 115 includes the structure, hardware, and components as illustrated for UE 115 of FIG. 2. For example, UE 115 includes controller/processor 280, which operates to execute logic or computer instructions stored in memory 282, as well as controlling the components of UE 115 that provide the features and functionality of UE 115. UE 115, under control of controller/processor 280, transmits and receives signals via wireless radios 801a-r and antennas 252a-r. Wireless radios 801a-r include various components and hardware, as illustrated in FIG. 2 for UE 115, including modulator/demodulators 254a-r, MIMO detector 256, receive processor 258, transmit processor 264, and TX MIMO processor 266.

One or more algorithms stored by the memory 282 configure processor/controller 280, transmit processor 264, and/or receive processor 258 to carry out one or more procedures relating to wireless communication by UE 115, as previously described. For example, preclusive data decompression failure logic 802 may be stored in memory 282 to enable and provide operation to avoid data decompression failures using predictive decompression failure indications and/or configuration for transmission recovery before reordering window timer expiration according to some aspects of the disclosure. Functions of flows 600 and/or 700 described above may, for example, be implemented by UE 115 using preclusive data decompression failure logic 802. For example, in an example where UDC is implemented, predictive data decompression failure logic 803 may comprise a database of one or more trigger events selected to predictively indicate decompression failure at a second device (e.g., base station 105) receiving compressed data from UE 115. Further, predictive data decompression failure logic 803 may comprise logic for detecting or otherwise determining the occurrence of a trigger event and for signaling a compressor reset for the transmission in correspondence to detecting the occurrence of the trigger event (e.g., based at least in part on determining an occurrence of a trigger event), as described above with respect to flow 600 of FIG. 6. Data decompression failure avoidance configuration logic 804 may, for example, include logic for identifying or otherwise determining one or more radio bearers for transmitting compressed data. In an example where UDC is implemented, data decompression failure avoidance configuration logic 804 may analyze signaling from base station 105 for information regarding radio bearer(s). Further, data decompression failure avoidance configuration logic 804 may include logic for configuring UE 115 for compression of data to be transmitted via the one or more radio bearers, such as by establishing prioritization for some data to provide transmission recovery before reordering window timer expiration. In accordance with some aspects of the disclosure, data decompression failure avoidance configuration logic 804 may include logic for configuring another device (e.g., base station 105) for data decompression failure avoidance, such as to providing signaling for implementing an increase in a duration of a reordering window timer at the other device.

Figure 9:
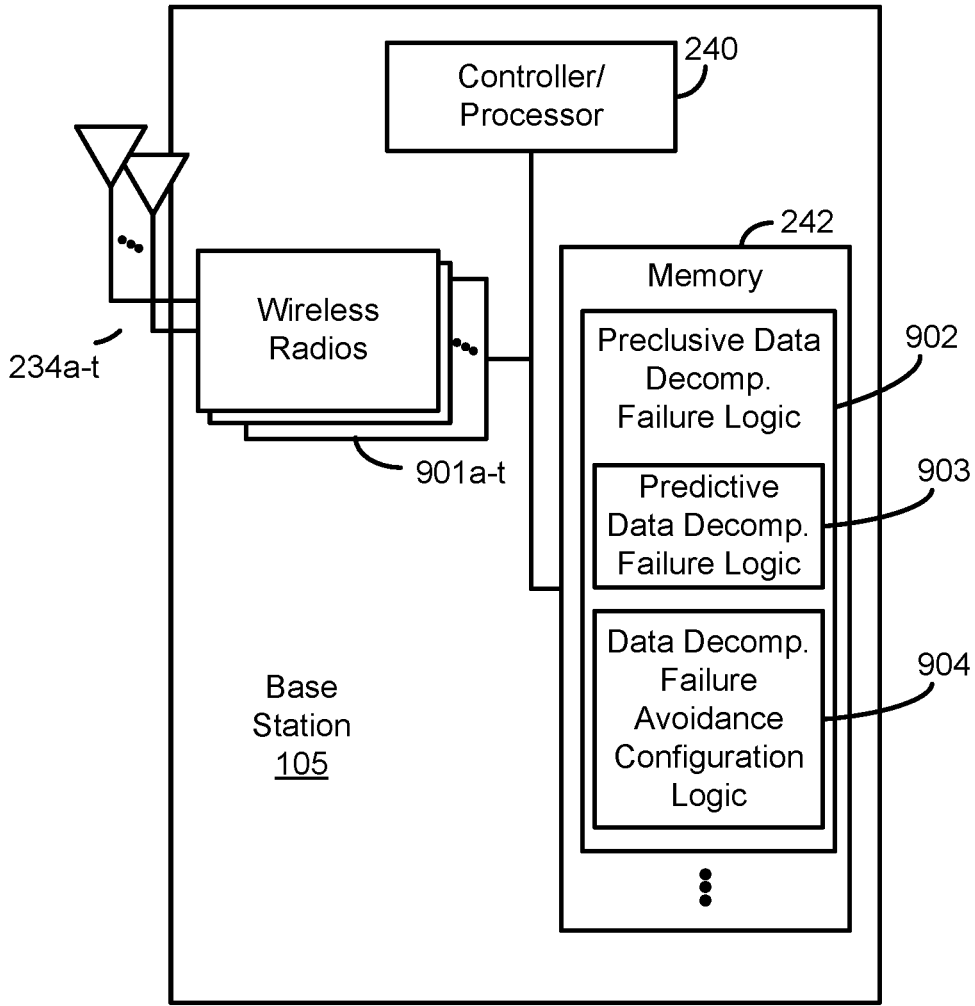
FIG. 9 is a block diagram conceptually illustrating a design of a base station configured for preclusive data compression failure operation according to some embodiments of the present disclosure.

FIG. 9 is a block diagram illustrating base station 105 configured according to one aspect of the present disclosure. Base station 105 includes the structure, hardware, and components as illustrated for base station 105 of FIG. 2. For example, base station 105 includes controller/processor 240, which operates to execute logic or computer instructions stored in memory 242, as well as controlling the components of base station 105 that provide the features and functionality of base station 105. Base station 105, under control of controller/processor 240, transmits and receives signals via wireless radios 901*a-t* and antennas 234*a-t*. Wireless radios 901*a-t* include various components and hardware, as illustrated in FIG. 2 for base station 105, including modulator/demodulators 232*a-t*, MIMO detector 236, receive processor 238, transmit processor 220, and TX MIMO processor 230.

One or more algorithms stored by the memory 242 configure processor/controller 240, transmit processor 220, and/or receive processor 228 to carry out one or more procedures relating to wireless communication by base station 105, as previously described. For example, preclusive data decompression failure logic 902 may be stored in memory 242 to enable and provide operation to avoid data decompression failures using predictive decompression failure indications and/or configuration for transmission recovery before reordering window timer expiration according to some aspects of the disclosure. Functions of flows 600 and/or 700 described above may, for example, be implemented by base station 105 using preclusive data decompression failure logic 902. In an example where UDC is implemented, predictive data decompression failure logic 903 may comprise a database of one or more trigger events selected to predictively indicate decompression failure. Predictive data decompression failure logic 903 may further comprise logic for providing information regarding trigger events of the one or more such trigger events to another device, such as UE 115, for use as predictive decompression failure indications in implementing preclusive data decompression failure operation. Data decompression failure avoidance configuration logic 904 may include information regarding one or more configuration for data decompression failure avoidance, such as information regarding prioritization for some data to provide transmission recovery before reordering window timer expiration. Data decompression failure avoidance configuration logic 904 may include logic for signaling data decompression failure avoidance configuration information to another device (e.g., UE 115). Additionally or alternatively, data decompression failure avoidance configuration logic 904 may include logic for configuring base station 105 for data decompression failure avoidance, such as by implementing an increase in a duration of a reordering window timer at the other device.

Although examples have been described above with regard to UE 115 of FIG. 8 and base station 105 of FIG. 9 configured for UDC operation, the illustrated examples may provide operation according to preclusive data decompression failure techniques with respect to data compression other than UDC. For example, in an example wherein downlink data compression is implemented, preclusive data decompression failure logic 802 may include information and logic corresponding to that described above with reference to preclusive data decompression failure logic 902, and correspondingly preclusive data decompression failure logic 902 may include information and logic corresponding to that described above with reference to preclusive data decompression failure logic 802.

1. Methods, apparatuses, and articles for wireless communication may provide for detecting, by logic of a first device providing transmission in a wireless network, an occurrence of a trigger event of a plurality of trigger events predictively indicating decompression failure at a second device in the wireless network receiving the transmission, and signaling, by the first device to the second device, a compressor memory reset for the transmission in correspondence to detecting the occurrence of the trigger event.

2. The methods, apparatuses, and articles of clause 1, wherein the trigger event predictively indicates decompression failure due to reordering window timer expiration at the second device.

3. The methods, apparatuses, and articles of any of clauses 1 and 2, wherein the trigger event corresponds to a reconfiguration between use of split radio bearers and use of non-split radio bearers.

4. The methods, apparatuses, and articles of any of clauses 1 and 2, wherein the trigger event corresponds to a SCG RLF.

5. The methods, apparatuses, and articles of any of clauses 1 and 2, wherein the trigger event corresponds to one or more RLC layer ARQ metrics measured by the first device.

6. The methods, apparatuses, and articles of any of clauses 1, 2, and 5, wherein the one or more RLC layer ARQ metrics comprise a round trip time versus reordering window timer duration metric.

7. The methods, apparatuses, and articles of any of clauses 1 and 2, wherein the trigger event corresponds to at least one of a MAC metric measured by the first device or a HARQ metric measured by the first device.

8. The methods, apparatuses, and articles of any of clauses 1, 2, and 7, wherein the at least one of the MAC metric or the HARQ metric comprise a BLER.

9. The methods, apparatuses, and articles of any of clauses 1 and 2, wherein the trigger event corresponds to at least one of a scheduling delay during an outstanding retransmission or a RLC layer status not being received by the first device.

10. The methods, apparatuses, and articles of any of clauses 1-9, further providing a dynamic compressor memory reset upon occurrence of any trigger event of the plurality of trigger events being met, wherein the detecting the occurrence of the trigger event and the signaling the compressor memory reset provide the dynamic compressor memory reset upon the occurrence of the trigger event.

11. The methods, apparatuses, and articles of any of clauses 1-10, further providing static compressor memory reset configured for periodic compressor memory reset for the transmission.

12. The methods, apparatuses, and articles of any of clauses 1-11, wherein the periodic compressor memory reset corresponds to a number of packets of the transmission.

13. The methods, apparatuses, and articles of any of clauses 1-12, further providing for establishing prioritization for some data of the transmission to provide transmission recovery before reordering window timer expiration at the second device.

14. The methods, apparatuses, and articles of any of clauses 1-13, wherein the establishing prioritization for some data of the transmission comprises prioritizing RLC layer level retransmissions of a bearer carrying compressed data of the transmission over transmissions of one or more other bearers.

15. The methods, apparatuses, and articles of any of clauses 1-13, wherein the establishing prioritization for some data comprises prioritizing a MAC level grant associated with the data.

16. The methods, apparatuses, and articles of any of clauses 1-15, further providing for increasing a duration of the reordering window timer.

17. The methods, apparatuses, and articles of any of clauses 1-16, wherein the duration of the reordering window timer is dynamically increased in correspondence with BLER conditions.

18. Methods, apparatuses, and articles for wireless communication may provide for identifying one or more radio bearers for transmission from a first device in a wireless network to a second device in the wireless network, and configuring the first device for compression of data to be transmitted via the one or more radio bearers, wherein the configuring the first device includes establishing prioritization for some data to provide transmission recovery before reordering window timer expiration at the second device.

19. The methods, apparatuses, and articles of clause 18, wherein the establishing prioritization for some data provides compression gain configured for a particular application associated with the data.

20. The methods, apparatuses, and articles of any of clauses 18 and 19, wherein the establishing prioritization for some data is configured in accordance with tolerance to latency by a particular application associated with the data.

21. The methods, apparatuses, and articles of any of clauses 18-20, wherein the establishing prioritization for some data comprises prioritizing RLC layer level retransmissions of a bearer carrying compressed data of the transmission over transmissions of one or more other bearers.

22. The methods, apparatuses, and articles of any of clauses 18-20, wherein the establishing prioritization for some data comprises prioritizing a MAC level grant associated with the data.

23. The methods, apparatuses, and articles of any of clauses 18-22, further providing for increasing a duration of the reordering window timer.

24. The methods, apparatuses, and articles of any of clauses 18-74, wherein the duration of the reordering window timer is dynamically increased in correspondence with BLER conditions.

25. The methods, apparatuses, and articles of any of clauses 18-24, further providing for detecting, by logic of the first device, an occurrence of a trigger event of a plurality of trigger events predictively indicating decompression failure at the second device, and signaling, by the first device to the second device, a compressor memory reset for the transmission in correspondence to detecting the occurrence of the trigger event.

26. The methods, apparatuses, and articles of any of clauses 18-25, wherein the trigger event predictively indicates decompression failure due to reordering window timer expiration at the second device.

27. The methods, apparatuses, and articles of any of clauses 18-25, wherein the trigger event corresponds to a reconfiguration between use of split radio bearers and use of non-split radio bearers.

28. The methods, apparatuses, and articles of any of clauses 18-25, wherein the trigger event corresponds to a SCG RLF.

29. The methods, apparatuses, and articles of any of clauses 18-25, wherein the trigger event corresponds to one or more RLC layer ARQ metrics measured by the first device.

30. The methods, apparatuses, and articles of clause 18-25, wherein the trigger event corresponds to at least one of a media access control (MAC) metric measured by the first device or a hybrid automated repeat request (HARM) metric measured by the first device.

31. The methods, apparatuses, and articles of clause 18-25, wherein the trigger event corresponds to at least one of a scheduling delay during an outstanding retransmission or a radio link control (RLC) layer status not being received by the first device.

32. The methods, apparatuses, and articles of clause 18-31, further comprising:

providing a dynamic compressor memory reset upon occurrence of any trigger event of the plurality of trigger events being met, wherein the detecting the occurrence of the trigger event and the signaling the compressor memory reset provide the dynamic compressor memory reset upon the occurrence of the trigger event.

34. The methods, apparatuses, and articles of clause 18-32, further comprising:

providing static compressor memory reset configured for periodic compressor memory reset for the transmission.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules described herein (e.g., the functional blocks and modules in FIG. 2) may comprise processors, electronics devices, hardware devices, electronics components, logical circuits, memories, software codes, firmware codes, etc., or any combination thereof. In addition, features discussed herein relating to preclusive data decompression failure techniques may be implemented via specialized processor circuitry, via executable instructions, and/or combinations thereof.

Those of skill would further appreciate that the various illustrative logical blocks, modules, circuits, and algorithm steps (e.g., the logical blocks in FIGS. 6 and 7) described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), hard disk, solid state disk, and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
detecting, by logic of a first device providing transmission of compressed data in a wireless network to a second device in the wireless network, an occurrence of a trigger event predictively indicating decompression failure at the second device resulting from a reference in a block of compressed data to an unavailable preceding block of compressed data, wherein the unavailable preceding block of compressed data is not available at the second device, wherein the occurrence of the trigger event is detected by the logic of the first device without the first device having received signaling from the second device signaling to control a compressor memory reset in correspondence with the trigger event, and wherein the trigger event is one trigger event of a plurality of different types of trigger events, wherein each trigger event of the plurality of different types of trigger events is selected for predictively indicating failure with respect to reference in blocks of compressed data to one or more unavailable preceding blocks of compressed data; and
signaling, by the first device to the second device, triggering of a reset of a compressor memory of the second device receiving the transmission of compressed data in correspondence to detecting the occurrence of the trigger event.

2. The method of claim 1, wherein the plurality of different types of trigger events comprise trigger events corresponding to different communication events in the wireless network, and wherein the trigger event corresponds to a communication event of the different communication events comprising decompression failure due to reordering window timer expiration at the second device.

3. The method of claim 1, wherein the trigger event corresponds to a reconfiguration between use of split radio bearers and use of non-split radio bearers, a secondary cell group (SCG) radio link failure (RLF), one or more radio link control (RLC) layer automatic repeat request (ARQ) metrics measured by the first device, at least one of a media access control (MAC) metric measured by the first device or a hybrid automated repeat request (HARQ) metric measured by the first device, or at least one of a scheduling delay during an outstanding retransmission or a radio link control (RLC) layer status not being received by the first device.

4. The method of claim 1, further comprising:
providing a dynamic compressor memory reset upon occurrence of any trigger event of the plurality of different types of trigger events being met, wherein the detecting the occurrence of the trigger event and the signaling of the triggering reset of the compressor memory of the second device provide the dynamic compressor memory reset upon the occurrence of the trigger event.

5. The method of claim 1, further comprising:
providing static compressor memory reset configured for periodic reset of the compressor memory of the second device for the transmission of compressed data, wherein the static compressor memory reset implements periodic reset of the compressor memory of the second device in correspondence to a number of packets of the transmission of compressed data, and wherein the periodic reset of the compressor memory of the second device is performed in addition to the reset of the compressor memory of the second device in correspondence to detecting the occurrence of the trigger event.

6. The method of claim 1, further comprising:

establishing prioritization for some data of the transmission of compressed data to provide transmission recovery before expiration of a reordering window timer implemented by the second device for establishing a duration in which packets of the transmission of compressed data are received for reordering and providing to an upper layer.

7. The method of claim 6, wherein establishing prioritization for some data of the transmission of compressed data comprises:

prioritizing radio link control (RLC) layer level retransmissions of a bearer carrying compressed data of the transmission of compressed data over transmissions of one or more other bearers; or prioritizing a media access control (MAC) level grant associated with the data.

8. The method of claim 6, wherein duration of the reordering window timer is dynamically increased in correspondence with block error rate (BLER) conditions.

9. An apparatus configured for wireless communication, the apparatus comprising:

a processing system that includes at least one processor and a memory coupled to the at least one processor, wherein the processing system is configured to cause the apparatus to:

detect, by a first device providing transmission of compressed data in a wireless network to a second device in the wireless network, an occurrence of a trigger event predictively indicating decompression failure at the second device resulting from a reference in a block of compressed data to an unavailable preceding block of compressed data, wherein the unavailable preceding block of compressed data is not available at the second device, wherein the occurrence of the trigger event is detected by the first device without the first device having received signaling from the second device signaling to control a compressor memory reset in correspondence with the trigger event, and wherein the trigger event is one trigger event of a plurality of different types of trigger events, wherein each trigger event of the plurality of different types of trigger events is selected for predictively indicating failure with respect to reference in blocks of compressed data to one or more unavailable preceding blocks of compressed data; and signal, by the first device to the second device, triggering of a reset of a compressor memory of the second device receiving the transmission of compressed data in correspondence to detecting the occurrence of the trigger event.

10. The apparatus of claim 9, wherein the plurality of different types of trigger events comprise trigger events corresponding to different communication events in the wireless network, and wherein the trigger event corresponds to a communication event of the different communication events comprising decompression failure due to reordering window timer expiration at the second device.

11. The apparatus of claim 9, wherein the trigger event corresponds to a reconfiguration between use of split radio bearers and use of non-split radio bearers, a secondary cell group (SCG) radio link failure (RLF), one or more radio link control (RLC) layer automatic repeat request (ARQ) metrics measured by the first device, at least one of a media access control (MAC) metric measured by the first device or a hybrid automated repeat request (HARQ) metric measured by the first device, at least one of a scheduling delay during an outstanding retransmission or a radio link control (RLC) layer status not being received by the first device.

12. The apparatus of claim 9, wherein the processing system is further configured to cause the apparatus to:

provide a dynamic compressor memory reset upon occurrence of any trigger event of the plurality of different types of trigger events being met, wherein detecting the occurrence of the trigger event and signaling reset of the compressor memory of the second device provide the dynamic compressor memory reset upon the occurrence of the trigger event.

13. The apparatus of claim 9, wherein the processing system is further configured to cause the apparatus to:

provide static compressor memory reset configured for periodic reset of the compressor memory of the second device for the transmission of compressed data, wherein the static compressor memory reset implements periodic reset of the compressor memory of the second device in correspondence to a number of packets of the transmission of compressed data, and wherein the periodic reset of the compressor memory of the second device is performed in addition to the reset of the compressor memory of the second device in correspondence to detecting the occurrence of the trigger event.

14. The apparatus of claim 9, wherein the processing system is further configured to cause the apparatus to:

establish prioritization for some data of the transmission of compressed data to provide transmission recovery before expiration of a reordering window timer implemented by the second device for establishing a duration in which packets of the transmission of compressed data are received for reordering and providing to an upper layer.

15. A method of wireless communication, comprising:

identifying one or more radio bearers for transmission of compressed data from a first device in a wireless network to a second device for receiving the transmission of compressed data in the wireless network;

configuring the first device for compression of data for the transmission of compressed data to the second device via the one or more radio bearers, wherein the configuring the first device includes establishing transmission prioritization at the first device for transmission of a portion of the compressed data from the first device to the second device and establishing a duration in which packets of the transmission of compressed data are received for reordering and providing to an upper layer, wherein transmission of the portion of the compressed data according to the transmission prioritization provides transmission recovery before expiration of a reordering window timer implemented by the second device for receiving the packets of the transmission of compressed data;

detecting, by logic of the first device, an occurrence of a trigger event which predictively indicates decompression failure at the second device receiving the transmission of compressed data resulting from a reference in a block of compressed data to a preceding block of compressed data which is not available at the second device, wherein the trigger event corresponds to a reconfiguration between use of split radio bearers and use of non-split radio bearers, a secondary cell group (SCG) radio link failure (RLF), one or more radio link control (RLC) layer automatic repeat request (ARQ) metrics measured by the first device, at least one of a media access control (MAC) metric measured by the first device or a hybrid automated repeat request (HARQ) metric measured by the first device, or at least one of a scheduling delay during an outstanding retransmission or a radio link control (RLC) layer status not being received by the first device; and signaling, by the first device to the second device, triggering of a reset of a compressor memory of the second device receiving the transmission of compressed data in correspondence to detecting the occurrence of the trigger event.

16. The method of claim 15, wherein the establishing transmission prioritization at the first device for transmission of the portion of the compressed data provides compression gain configured for a particular application associated with the data.

17. The method of claim 15, wherein the establishing transmission prioritization at the first device for transmission of the portion of the compressed data is configured in accordance with tolerance to latency by a particular application associated with the data.

18. The method of claim 15, wherein the establishing transmission prioritization at the first device for transmission of the portion of the compressed data comprises:

prioritizing radio link control (RLC) layer level retransmissions of a bearer carrying compressed data of the portion of compressed data over transmissions of one or more other bearers; or prioritizing a media access control (MAC) level grant associated with the data.

19. The method of claim 15, wherein the duration of the reordering window timer is dynamically increased in correspondence with block error rate (BLER) conditions.

20. The method of claim 15 wherein the trigger event predictively indicates decompression failure due to reordering window timer expiration at the second device.

21. The method of claim 15, further comprising:

providing a dynamic compressor memory reset upon occurrence of the trigger event, wherein the detecting the occurrence of the trigger event and the signaling of the triggering reset of the compressor memory of the second device provide the dynamic compressor memory reset upon the occurrence of the trigger event.

22. The method of claim 15, further comprising:

providing static compressor memory reset configured for periodic reset of the compressor memory of the second device for the transmission of compressed data, wherein the static compressor memory reset implements periodic reset of the compressor memory of the second device in correspondence to a number of packets of the transmission of compressed data, and wherein the periodic reset of the compressor memory of the second device is performed in addition to the reset of the compressor memory of the second device in correspondence to detecting the occurrence of the trigger event.

23. An apparatus configured for wireless communication, the apparatus comprising:

a processing system that includes at least one processor and a memory coupled to the at least one processor, wherein the processing system is configured to cause the apparatus to:

identify one or more radio bearers for transmission of compressed data from a first device in a wireless network to a second device for receiving the transmission of compressed data in the wireless network;

configure the first device for compression of data for the transmission of compressed data to the second device via the one or more radio bearers, wherein configuring the first device includes establishing transmission prioritization at the first device for transmission of a portion of the compressed data from the first device to the second device and establishing a duration in which packets of the transmission of compressed data are received for reordering and providing to an upper layer, wherein transmission of the portion of the compressed data according to the transmission prioritization provides transmission recovery before expiration of a reordering window timer implemented by the second device for receiving the packets of the transmission of compressed data;

detect, by logic of the first device, an occurrence of a trigger event of a plurality of different types of trigger events selected as predictively indicating decompression failure at the second device receiving the transmission of compressed data resulting from a reference in a block of compressed data to a preceding block of compressed data which is not available at the second device;

signal, by the first device to the second device, triggering of a reset of a compressor memory of the second device receiving the transmission of compressed data in correspondence to detecting the occurrence of the trigger event; and provide a static compressor memory reset configured for periodic reset of the compressor memory of the second device for the transmission of compressed data, wherein the static compressor memory reset implements periodic reset of the compressor memory of the second device in correspondence to a number of packets of the transmission of compressed data, and wherein the periodic reset of the compressor memory of the second device is performed in addition to the reset of the compressor memory of the second device in correspondence to detecting the occurrence of the trigger event.

24. The apparatus of claim 23, wherein the establishing transmission prioritization at the first device for transmission of the portion of compressed data provides compression gain configured for a particular application associated with the data.

25. The apparatus of claim 23, wherein the establishing transmission prioritization at the first device for transmission of the portion of compressed data is configured in accordance with tolerance to latency by a particular application associated with the data.

26. The apparatus of claim 23, wherein the processing system is further configured to cause the apparatus to:

prioritize radio link control (RLC) layer level retransmissions of a bearer carrying compressed data of the transmission of compressed data over transmissions of one or more other bearers; or prioritize a media access control (MAC) level grant associated with the data.

27. The apparatus of claim 23, wherein the duration of the reordering window timer is dynamically increased in correspondence with block error rate (BLER) conditions.

\* \* \* \* \*